(12) United States Patent
Shoemaker et al.

(10) Patent No.: US 7,705,722 B2
(45) Date of Patent: Apr. 27, 2010

(54) ACTIVE BODY VENTILATION SYSTEM

(75) Inventors: James H. Shoemaker, White Lake, MI (US); Warren J. Miedinger, Lansing, MI (US); Andrew J. Novajovsky, Grand Blanc, MI (US); Douglas V. Melonson, Detroit, MI (US); Heather A. Cochran, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 497 days.

(21) Appl. No.: 11/671,477

(22) Filed: Feb. 6, 2007

(65) Prior Publication Data

US 2008/0186158 A1  Aug. 7, 2008

(51) Int. Cl.
*G08B 19/00* (2006.01)
(52) U.S. Cl. .......................... 340/521; 340/449; 49/31; 296/147; 454/75
(58) Field of Classification Search ................. 340/521, 340/459, 449, 501, 584, 588, 693.5, 693.9; 49/31, 379, 141, 394; 296/154, 146.1, 147, 296/148, 149, 146.9; 454/359, 75, 141, 162; 701/1, 49, 36

See application file for complete search history.

(56) References Cited

U.S. PATENT DOCUMENTS 4,972,765 A * 11/1990 Dixon ......................... 454/164
5,509,852 A * 4/1996 Clark ........................... 454/75
6,688,963 B2 * 2/2004 Boiger ......................... 454/75
7,013,656 B2 * 3/2006 Yanagimachi et al. ......... 62/126

FOREIGN PATENT DOCUMENTS

DE  3320551 A1  12/1983
DE  19927180 C1  8/2000
JP  10278564  10/1998

OTHER PUBLICATIONS

German Office Action in German Application 102008007462.4-16 corresponding to U.S. Appl. No. 11/671,477. Action dated Sep. 16, 2009.

* cited by examiner

*Primary Examiner*—Toan N Pham

(57) ABSTRACT

An active body ventilation system which is dynamically responsive to vehicle status parameters, including for example the door open/closed status and the HVAC system status. An active ventilation unit is attached with a body wall which includes a portal housing defining a portal, a portal cover and a portal cover actuator for selectively adjusting the portal cover to thereby increase or decrease the unobstructed size of the opening of the portal. The active ventilation unit is interfaced electronically to various sensors of the motor vehicle, in which programming of an electronic control module determines optimum positioning of the portal covering via selective actuation of the portal cover actuator.

11 Claims, 6 Drawing Sheets

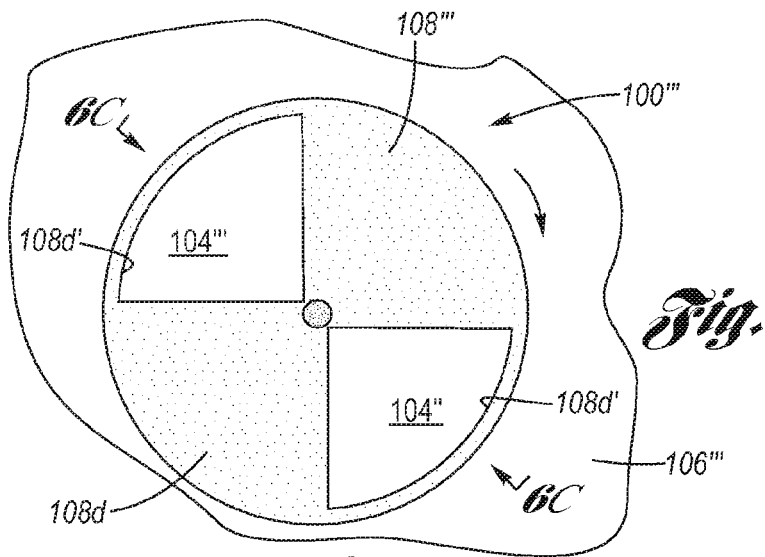
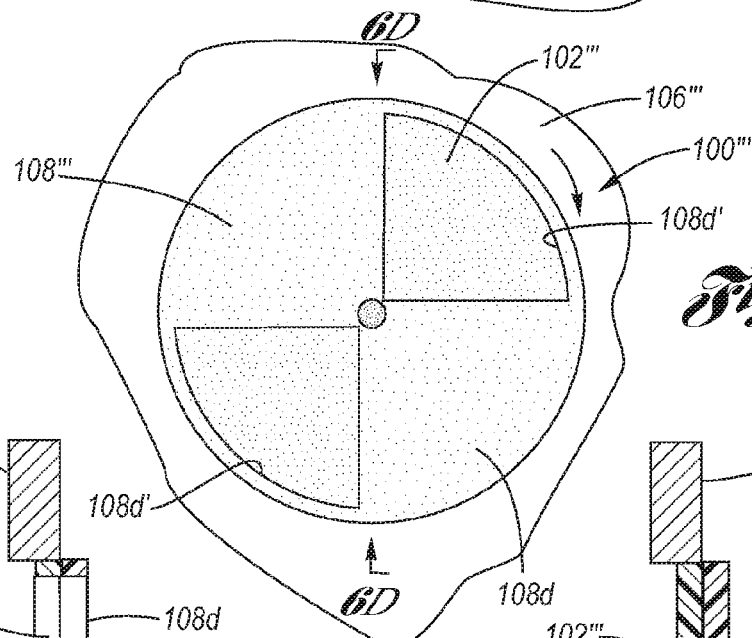
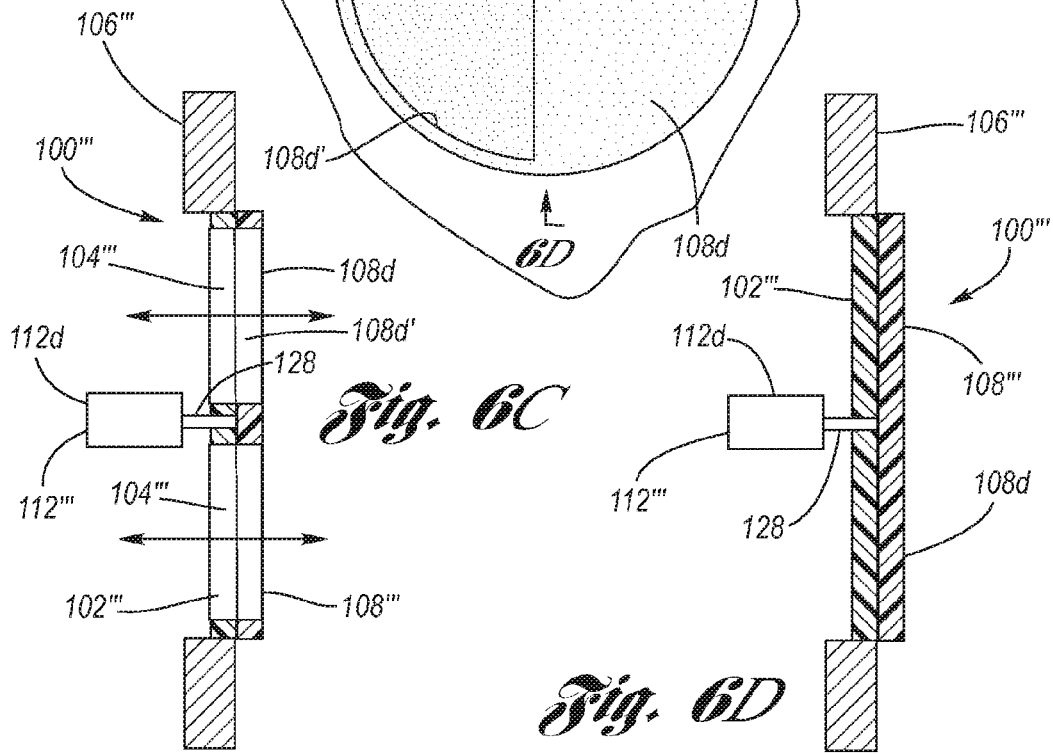

ACTIVE BODY VENTILATION SYSTEM

TECHNICAL FIELD

The present invention relates to body ventilation of the passenger compartment of motor vehicles, and more particularly to a body ventilation system which is actively responsive to changes in sensed motor vehicle parameters.

BACKGROUND OF THE INVENTION

The passenger compartment of motor vehicles provides a space which provides protection to the occupants from environmental elements. To this end, the body of the vehicle defining the passenger compartment is preferably tight fitted at the door (by the term "door" is meant an expansive definition which includes doors, hatches, liftglass, decklids (trunklid), liftgates, etc.) and window seams, and provides an enclosure which keeps out dust, wind and water, and minimizes the passenger perception of road noise. In this respect, the more air-tight the body, the better. However, the air-tight quality of the body defining a passenger compartment must not be too air-tight for purposes of ease of closing a door and for purposes of efficient operation of the heating, ventilation and air conditioning (HVAC) system.

When a door is closed, the movement of the door is accompanied by a substantial movement of air into the body. This in rush of air creates a pressure increase (air compression) within the body which needs release to the atmosphere, otherwise the increase in pressure will make full closure of the door difficult and also give any occupant the sensation of an ear pop at closure. Indeed, when one considers a door in the form of a decklid, the closure of the decklid can also cause air compression within the body, as for example by air flowing through the back seat.

The passengers need ventilation, and when the HVAC system is active, the fan and/or the vehicle movement draws air into the body, thereby causing an increase in air pressure within the passenger compartment. Accordingly, this incoming air needs some means of escape in order that air in the passenger compartment is able to periodically turn over, and so that the pressure does not increase to an extent that an untoward burden is placed on the function of the HVAC system.

In the prior art, the solution of choice for providing an air-tight passenger compartment which is selectively vented has been to install passive flap vents at the body wall defining the passenger compartment. FIGS. 1A and 1B depict an example of a conventional passive body ventilation flap valve 10. The flap valve 10 includes a flap housing 12 which is attached to an opening in the body 14. A pair of flaps 16 are connected at one end thereof, respectively, to the flap housing 12, preferably composed of a plastic. Each of the flaps 16 is composed of a resiliently flexible material, as for example a rubber or plastic, which is resiliently biased into the closed position (see FIG. 1A) so as to cover respective ports 18 (see FIG. 1B). When air pressure within the body (i.e., the passenger compartment) increases above atmospheric pressure, the flaps resiliently bend into an open position, as for example depicted at FIG. 1B so that air can pass out of the body through the ports 18 until the pressure becomes generally equalized. FIGS. 2A through 2D depict other examples of prior art flap valves 10a-10d, each composed of a flap housing 12a-12d with a plurality of resiliently flexible flaps 16a-16d each covering a respective port (not visible in the views).

While flap valves are simple and generally inexpensive components, they suffer from certain drawbacks. One significant draw back is that a flap valve is inherently unable to provide a high level of road noise isolation with respect to the passenger compartment. For another, the passive nature of flap valves does not allow for dynamic response to the operational status of the HVAC system. Still further, since the resiliency and response rate of the flaps of the flap valves is preset, there is always going to be some air compression inside the passenger compartment when a door is shut which will require additional door push energy to overcome; and if a door is slammed, passenger ear discomfort may be sensed. Further yet, when a door is opened, since the flap valves are essentially one-way, a suction can be created which makes the door harder to open during the initial phase of opening.

Accordingly, what remains needed in the art is a body ventilation system which is actively responsive to vehicle status parameters, including for example the door open/closed status and the HVAC system status.

SUMMARY OF THE INVENTION

The present invention is an active body ventilation system which is dynamically responsive to vehicle status parameters, including for example the door open/closed status and the HVAC system status.

The active body ventilation system includes an active ventilation unit attached with a body wall which includes a portal housing defining a portal, a portal cover and a portal cover actuator for selectively adjusting the portal cover to thereby increase or decrease the unobstructed size of the opening of the portal. The active ventilation unit is interfaced electronically to various sensors of the motor vehicle, in which programming of an electronic control module determines optimum positioning of the portal covering via selective actuation of the portal cover actuator.

As an example of operation, sensors include an ignition on (engine running) sensor, door open sensors and HVAC operational status sensors. According to one scenario of operation, if a door is sensed to be open, the electronic control module will send, based upon its programming, a signal to the cover actuator to move the portal cover to its fully open position, whereby as the door is closed, inconsequential air compression within the passenger compartment will occur. Upon sensing the door closed, a signal is thereupon sent to the cover actuator to move the portal cover to its closed position. According to a second scenario of operation, in response to sensing the status of operation of the HVAC system, a signal is sent by the electronic control module, according to its programming, to the cover actuator so as to adjustably move the portal cover so as to dynamically increase and decrease the opening size of the portal in concert with an optimum operation of the HVAC system.

Accordingly, it is an object of the present invention to provide an active body ventilation system which is dynamically responsive to vehicle status parameters, including for example the door open/closed status and the HVAC system status.

This and additional objects, features and advantages of the present invention will become clearer from the following specification of a preferred embodiment.

BRIEF DESCRIPTION OF THE DRAWINGS

FIGS. 6A and 6B are perspective views of an active ventilation unit of the active body ventilation system according to a fourth embodiment of the present invention, shown in the fully closed and open states, respectively.

FIG. 6C is a section view taken along line 6C-6C of FIG. 6A.

FIG. 6D is a section view taken along line 6D-6D of FIG. 6B.

DESCRIPTION OF THE PREFERRED EMBODIMENT

Figure 1A:
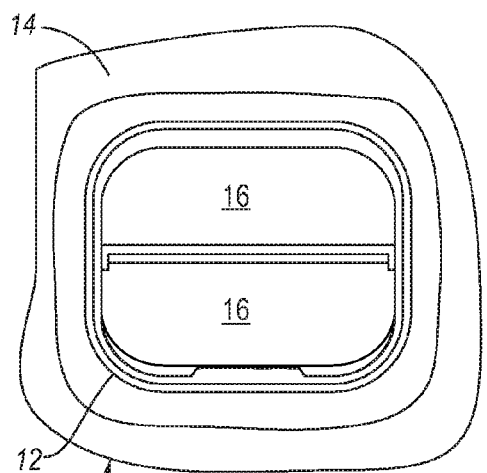
FIGS. 1A and 1B depict a prior art passive body ventilation flap valve in the closed and open states of operation, respectively.
Figure 1B:
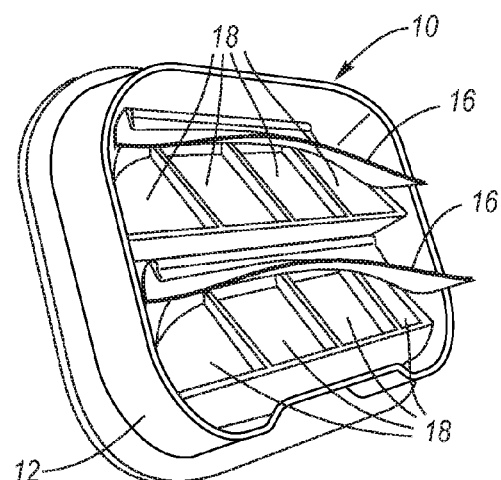
Figure 2A:
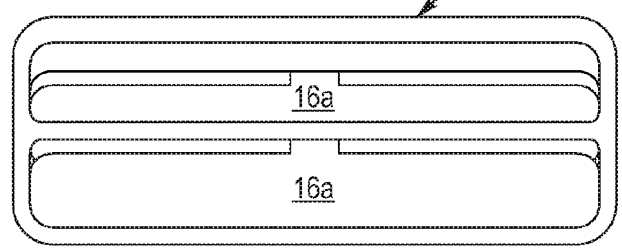
FIGS. 2A through 2D depict various examples of prior art passive body ventilation flap valves.
Figure 2B:
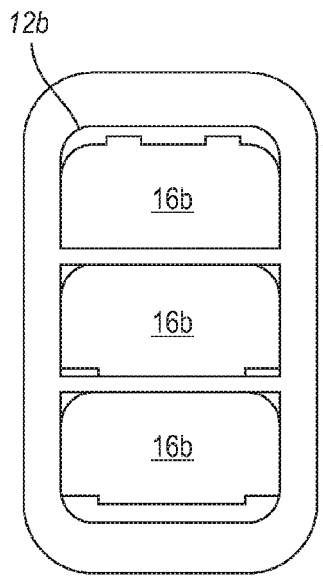
Figure 2C:
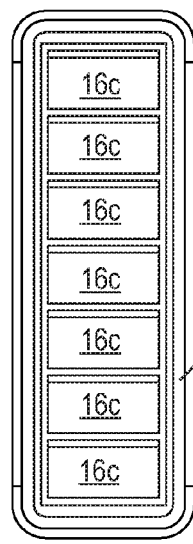
Figure 2D:
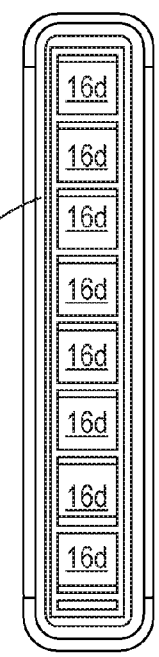

Referring now to the Drawing, FIGS. 3 through 8 depict examples of implementation of the active body ventilation system according to the present invention.

Figure 3:
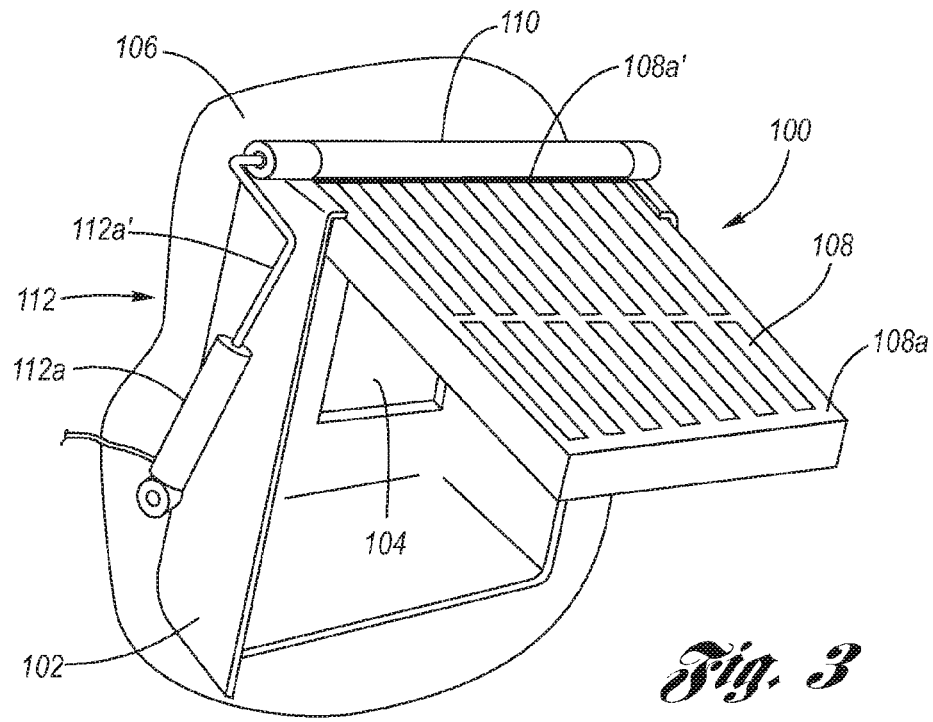
FIG. 3 is a perspective view of an active ventilation unit of the active body ventilation system according to a first embodiment of the present invention.

Referring firstly to FIG. 3, an example of an active ventilation unit 100 according to a first embodiment of the active body ventilation system 200 (see FIG. 7) is depicted. The active ventilation unit 100 includes a portal housing 102 which defines a portal 104 having a predetermined portal opening size. The portal housing 102 is attached to a body wall 106 of the vehicle body such that the portal provides an opening therethrough which allows for air passage between the passenger compartment and the atmosphere exterior thereto. The active ventilation unit 100 further includes a portal cover 108 which is movably attached to the portal housing 102. The portal cover may have sound deadening material applied thereto as an added barrier to road noise passing therethrough. In the example of FIG. 3, the portal cover 108 is composed of a panel 108a, wherein a top edge 108a' thereof is pivotally connected to hinge mechanism 110. The active ventilation unit 100 still further includes a portal cover actuator 112 for selectively moving the portal cover 108 between a fully open position (whereat the portal is open a preselected maximum amount) and a fully closed position (whereat the portal is closed, shutting-off air flow through the portal). By way of example in FIG. 3, the cover actuator is a pneumatic linear actuator 112a, controlled by an electric valving, which controls pivoting of the portal cover at the hinge mechanism 110 via a crank 112a'.

Other configurations (embodiments) of active ventilation units may be designed by an ordinarily skilled artisan based upon the general principles of the disclosure presented herein, and any such alternative embodiment is contemplated broadly by the present disclosure. In this regard, FIGS. 4A through 6D depict three such alternative ventilation units, merely by way of exemplification and not limitation. It is to be noted that in any of the configurations discussed the singular of "portal" and "aperture" includes the plural, and refers to there being at least one of same.

Figure 4A:
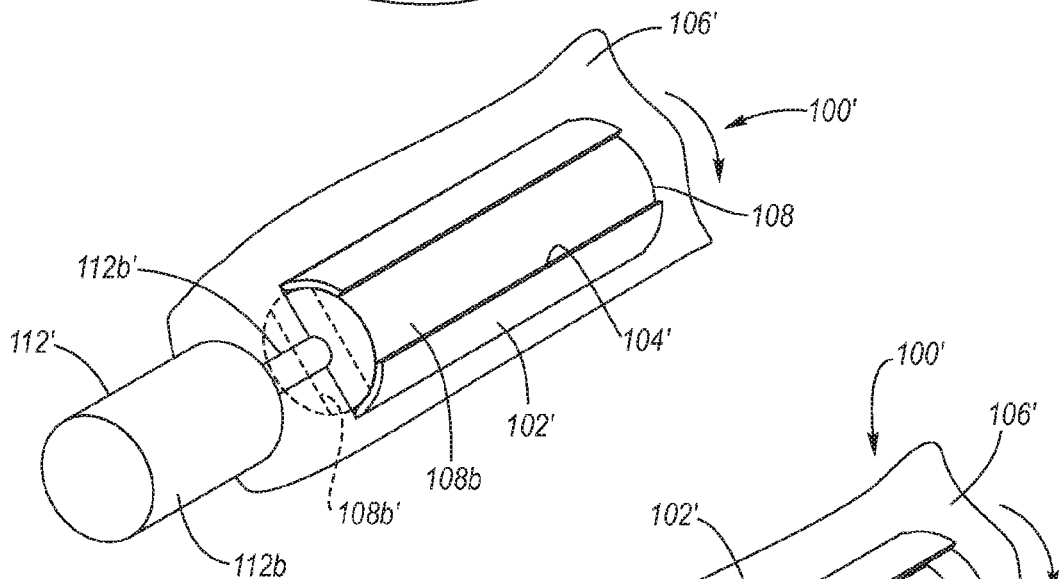
FIGS. 4A and 4B are perspective views of an active ventilation unit of the active body ventilation system according to a second embodiment of the present invention, shown in the fully closed and open states, respectively.
Figure 4B:
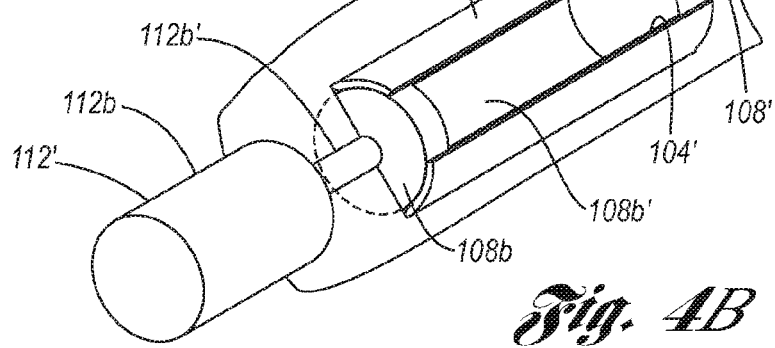

Referring to FIGS. 4A and 4B, an example of an active ventilation unit 100' according to a second embodiment of the active body ventilation system 200 is depicted. The active ventilation unit 100' includes a portal housing 102' which defines a portal 104' having a predetermined portal opening size. The portal housing 102' is attached to a body wall 106' such that the portal passes therethrough and provides an air passage with respect to the passenger compartment and the atmosphere exterior thereto. The active ventilation unit 100' further includes a portal cover 108' which is movably attached to the portal housing 102'. In the example of FIGS. 4A and 4B, the portal cover 108' is composed of an apertured cylindrical drum 108b rotatably mounted to the portal housing 102'. The aperture 108b' of the drum 108b selectively aligns with the portal depending upon the rotational position thereof. The active ventilation unit 100' still further includes a portal cover actuator 112' for selectively moving the portal cover 108' (i.e., rotating the drum 108b) between a fully open position as shown at FIG. 4A (whereat the aperture 108b' is aligned with the portal 104' so that the portal 108' is open a predetermined maximum amount) and a fully closed position as shown at FIG. 4B (whereat the aperture is not aligned with the portal, and air flow through the portal is shut-off). By way of example in FIGS. 4A and 4B, the cover actuator is an electric motor 112b, the shaft 112b' of which connecting to the drum 108b.

Figure 5A:
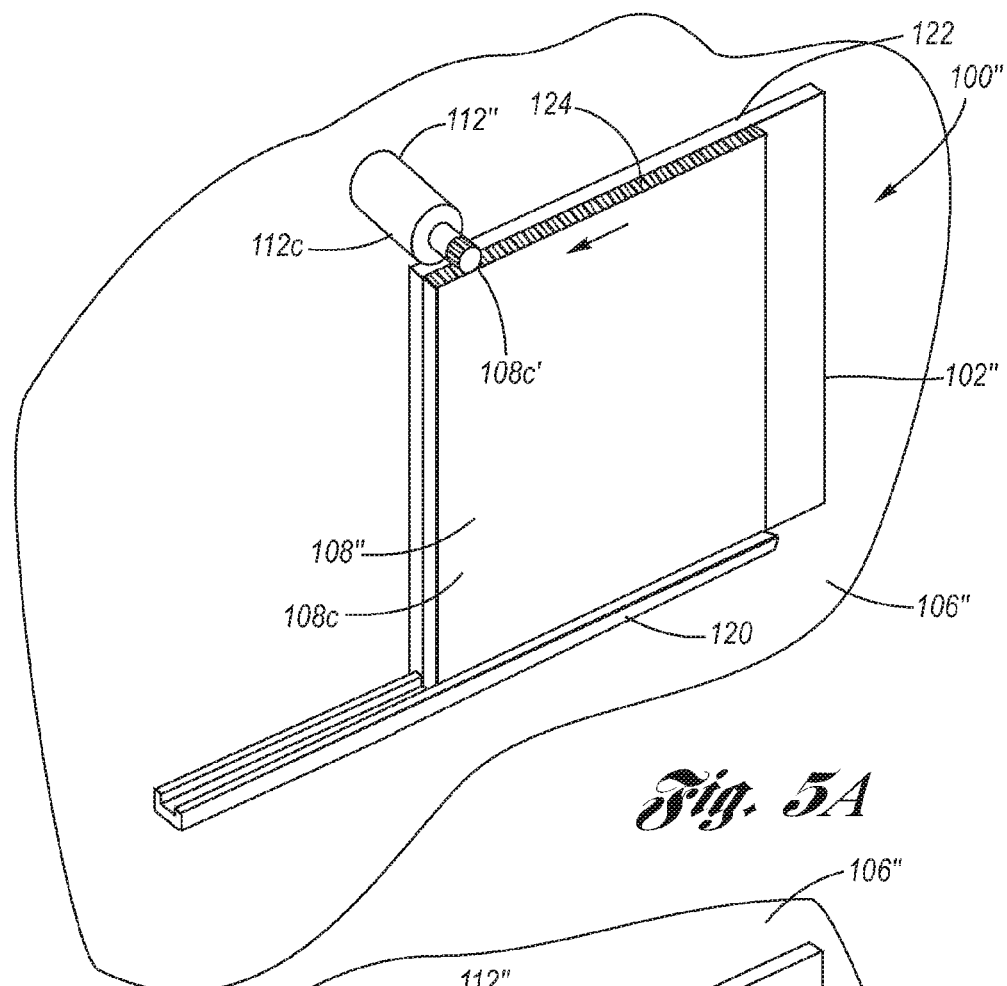
FIGS. 5A and 5B are perspective views of an active ventilation unit of the active body ventilation system according to a third embodiment of the present invention, shown in the fully closed and open states, respectively.
Figure 5B:
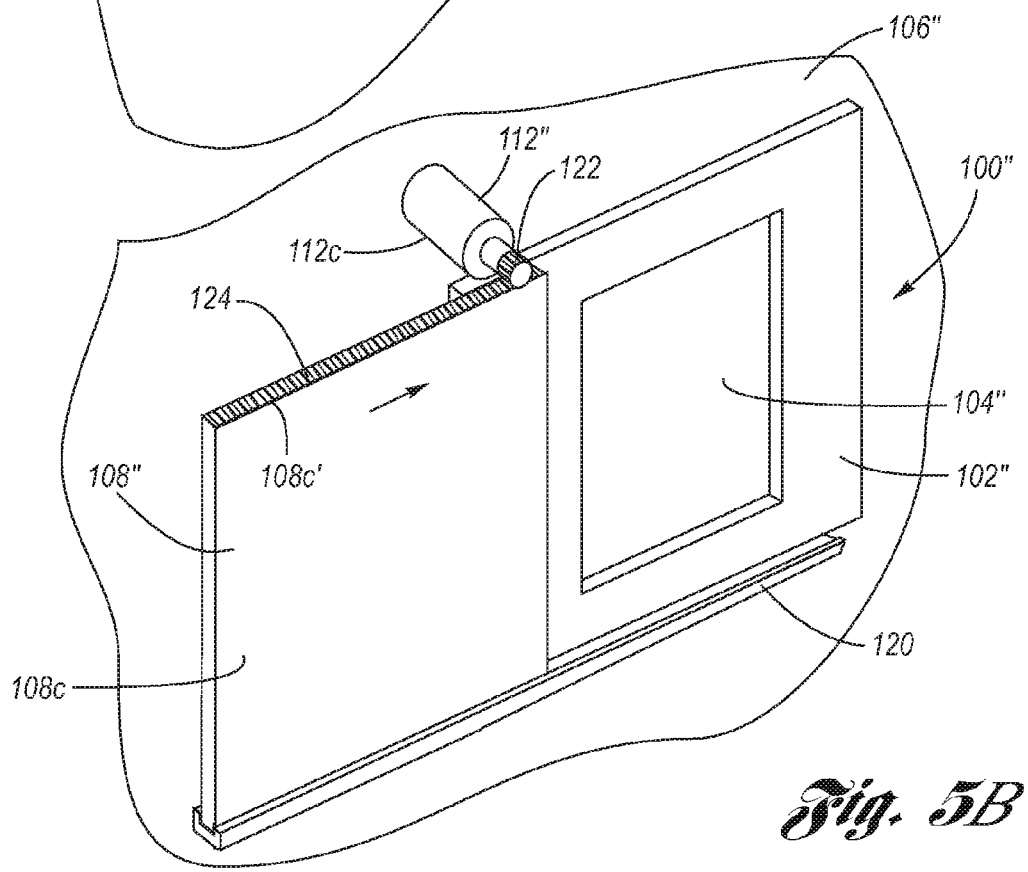

Referring to FIGS. 5A and 5B, an example of a ventilation unit 100" according to a third embodiment of the active body ventilation system 200 is depicted. The active ventilation unit 100" includes a portal housing 102" which defines a portal 104" having a predetermined portal opening size. The portal housing 102" is attached to a body wall 106" such that the portal passes therethrough and provides an air passage with respect to the passenger compartment and the atmosphere exterior thereto. The active ventilation unit 100" further includes a portal cover 108" which is movably attached to the portal housing 102". In the example of FIGS. 5A and 5B, the portal cover 108" is composed of a panel 108c slidably mounted, via a channel 120, to the portal housing 102". The active ventilation unit 100" still further includes a portal cover actuator 112" for selectively moving the portal cover 108" (i.e., sliding the panel 108c) between a fully open position as shown at FIG. 5A (whereat the panel has been slid sideways in relation to the portal 104" so as to open the portal a predetermined maximum amount) and a fully closed position as shown at FIG. 5B (whereat the panel has been slid so as to fully cover the portal and thereby shutting off air flow through the portal). By way of example in FIGS. 5A and 5B, the cover actuator is an electric motor 112c, a gear 122 of which engaging a linear gear 124 at an edge 108c' of the panel 108c.

Referring to FIGS. 6A through 6D, an example of a ventilation unit 100''' according to a fourth embodiment of the active body ventilation system 200 is depicted. The active ventilation unit 100''' includes a portal housing 102''' which defines a portal 104''' having a predetermined portal opening size. The portal housing 102''' is attached to a body wall 106''' such that the portal passes therethrough and provides an air passage with respect to the passenger compartment and the atmosphere exterior thereto. The active ventilation unit 100''' further includes a portal cover 108''' which is movably attached to the portal housing 102'''. In the example of FIGS.

6A through 6D, the portal cover 108''' is composed of an apertured disk 108*d* rotatably mounted to a motor shaft 128 passing through the portal housing 102'''. The active ventilation unit 100''' still further includes a portal cover actuator 112''' for selectively moving the portal cover 108''' (i.e., rotating the disk 108*d*) between a fully open position as shown at FIGS. 6A and 6C (whereat the disk has been rotated so that the portal 104" is aligned with the aperture 108*d'* of the disk 108*d* so as to be open a predetermined maximum amount and air A flows through (in either direction)), and a fully closed position as shown at FIGS. 6B and 6D (whereat the disk has been rotated so as to fully cover the portal and thereby shut off air flow through the portal). By way of example in FIGS. 6A through 6D, the cover actuator is an electric motor 112*d*, having the aforementioned motor shaft 128.

Figure 7:
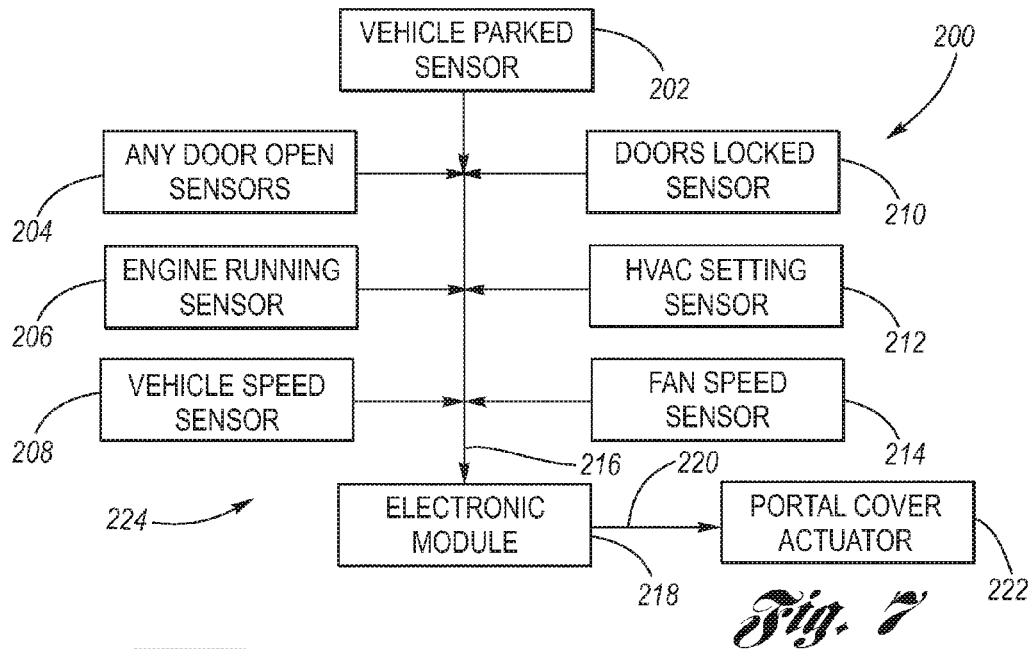
FIG. 7 is a schematic diagram of a structural implementation of the active body ventilation system according to the present invention.

Turning attention now to FIG. 7, a schematic diagram of an example of a structural implementation of the active body ventilation system 200 is depicted.

A plurality of sensors are provided, as for nonlimiting example: a vehicle parked sensor 202 (for automatic transmission vehicles this may be in the form of a gear (or shift lever) in park sensor, for manual transmission vehicles this may be in the form of an emergency brake on sensor), any door open sensors (door ajar sensors) 204; engine running (ignition on) sensor 206, vehicle speed sensor 208; doors locked (and/or unlocked) sensor 210; HVAC system setting sensor 212; and an HVAC system fan speed sensor 214. The sensor data 216 is input to an electronic control module 218, which may be for example the engine control module or another computer device of the vehicle. Programming (operational algorithm as for example indicated at FIG. 8) of the electronic control module in accordance with the sensor data 216, results in the electronic control module 218 sending an output signal 220 to the portal cover actuator 222 (as for example the portal cover actuators 112, 112' and 112" described hereinabove), whereby the portal cover actuator causes the portal cover to be moved to an appropriate position with respect to the portal such that the air flow therethrough is optimal with respect to the sensed status of the vehicle. The electronic components 202-220 collectively constitute an electronic control system 224 for regulating actuation of the portal cover actuator 222.

Figure 8:
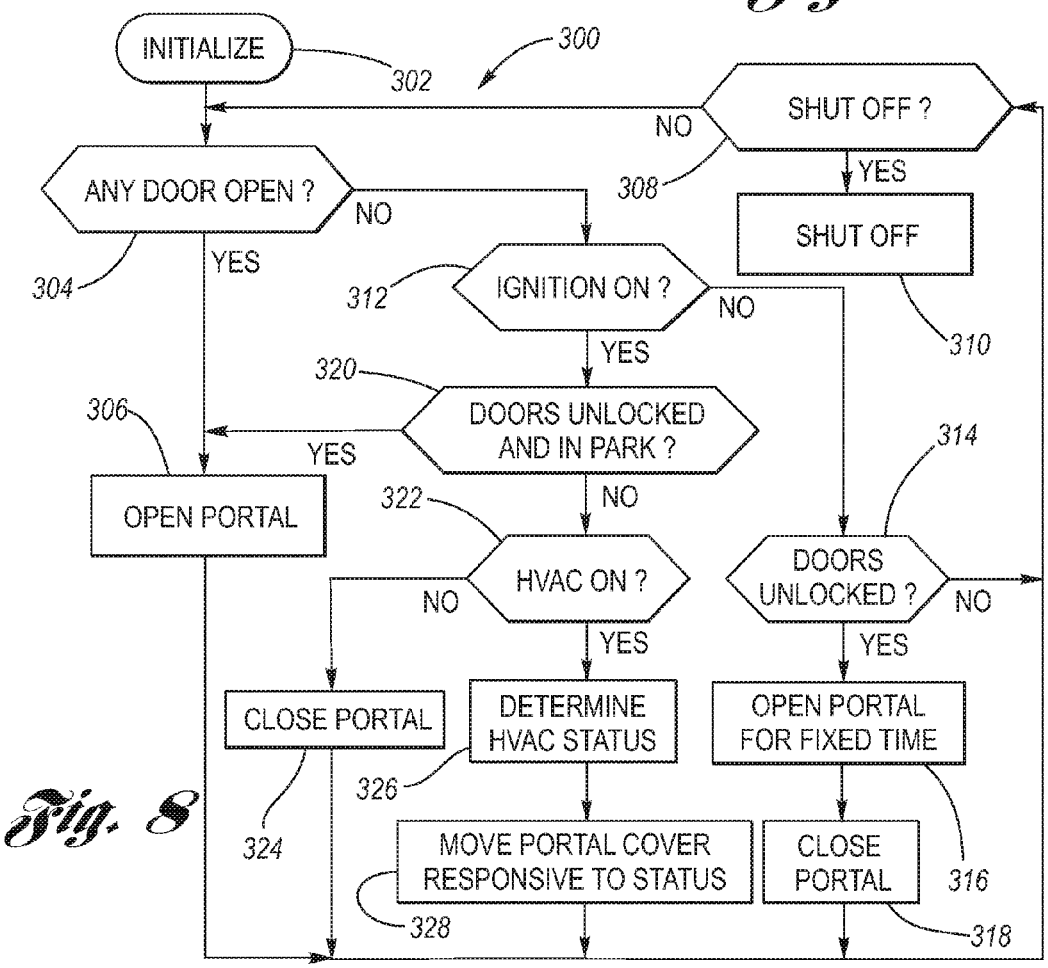
FIG. 8 is an algorithm of a programming implementation of the active body ventilation system according to the present invention.

An operational algorithm (program) 300 for the electronic control module 218 of the active body ventilation system 200 (see FIG. 7) is shown at FIG. 8.

The program 300 is initialized at execution Block 302, as for example when the any preselected initial vehicle use event happens, such as for example the doors being unlocked or a door opened. The program then advances to decision Block 304, where inquiry is made whether the sensor data (see Block 204 of FIG. 7) indicates any door is open.

If the answer to the inquiry at decision Block 304 is yes, then at execution Block 306 the electronic control module (see Block 218 of FIG. 7) sends a signal (see Block 220 of FIG. 7) to the portal cover actuator (see Block 222 of FIG. 7) to cause the portal cover to be moved to its fully open position with respect to the portal. Thereupon, the program advances to decision Block 308, where inquiry is made whether the program is to continue to run or is to be shut off due to inactivity of the vehicle (i.e., no sensed vehicle activity for a predetermined time). If the answer to the inquiry at decision Block 308 is yes, then the program advances to execution Block 310 and the program is shut off; however, if the answer to the inquiry at decision Block 308 was no, then the program returns to decision Block 304.

If the answer to the inquiry at decision Block 304 was no, then the program advances to decision Block 312, where inquiry is made, using the sensor data (see Block 206 in FIG. 7), whether the engine is running.

If the answer to the inquiry at decision Block 312 is no, then the program advances to decision Block 314, where inquiry is made, using the sensor data (see Block 210 of FIG. 7), whether the doors are unlocked. If the answer to the inquiry at decision Block 314 is no, then the program advances to decision Block 308 and proceeds as described above; however, if the answer to the inquiry at decision Block 314 was yes, then the program advances to execution Block 316, where the electronic control module sends a signal to the portal cover actuator to move the portal cover to the fully open position (this is intended to anticipate a door opening), whereupon after a predetermined time, as for example ten minutes, the program advances to execution Block 318, where the electronic control module sends a signal to the portal cover actuator to move the portal cover to cover (close) the portal. Thereafter, the program advances to decision Block 308 and proceeds as described above. In this regard, Blocks 314, 316, 318 are an optional set of blocks of the program 300, and in their absence a no answer to the inquiry at decision Block 312 would result in the program advancing directly to decision Block 308.

However, if the answer to the inquiry at decision Block 312 was yes, then the program advances to decision Block 320, where inquiry is made, using the sensor data (see Blocks 202 and 210 in FIG. 7) whether the doors are unlocked and the vehicle is parked. If the answer to the inquiry at decision Block 320 is yes (that is, yes to both the doors being unlocked and the vehicle being parked), then the program advances to execution Block 306 and proceeds as described above (this is intended to anticipate a door opening). However, if the answer to the inquiry at decision Block 320 was no, then the program advances to decision Block 322, where inquiry is made, using the sensor data (see Block 212 of FIG. 7), whether the heating, ventilation and air conditioning (HVAC) system is turned on (operating). In this regard, Block 320 is an optional block of the program 300, and in its absence a yes answer to the inquiry at decision Block 312 would result in the program advancing directly to decision Block 322.

If the inquiry at decision Block 322 is no, then the program advances to execution Block 324, where the electronic control module sends a signal to the portal cover actuator to cause the portal cover to cover (close) the portal. Thereafter, the program advances to decision Block 308 and proceeds as described above.

However, if the answer to the inquiry at decision Block 322 was yes, then the program advances to execution Block 326 where, using the sensor data (Blocks 208, 212 and 214 of FIG. 7) the operational status of the HVAC system is determined (in this regard, vehicle speed is factored as an air flow augmentation to air flow being driven by the fan). Thereupon, the program advances to execution Block 328, where the electronic control module sends a signal to the portal cover actuator to move the portal cover so that the portal is covered by an amount, according to predetermined criteria of the program, so that the HVAC system operates optimally. Thereupon, the program advances to decision Block 308 and proceeds as described above.

Dynamic adjustment of the portal cover at execution Block 328 with respect to the amount the portal is open in response to the HVAC status determined at Block 326 is provided by the program 300 based upon the rate at which the program recycles, as for example once every thousandth second.

Figure 9:
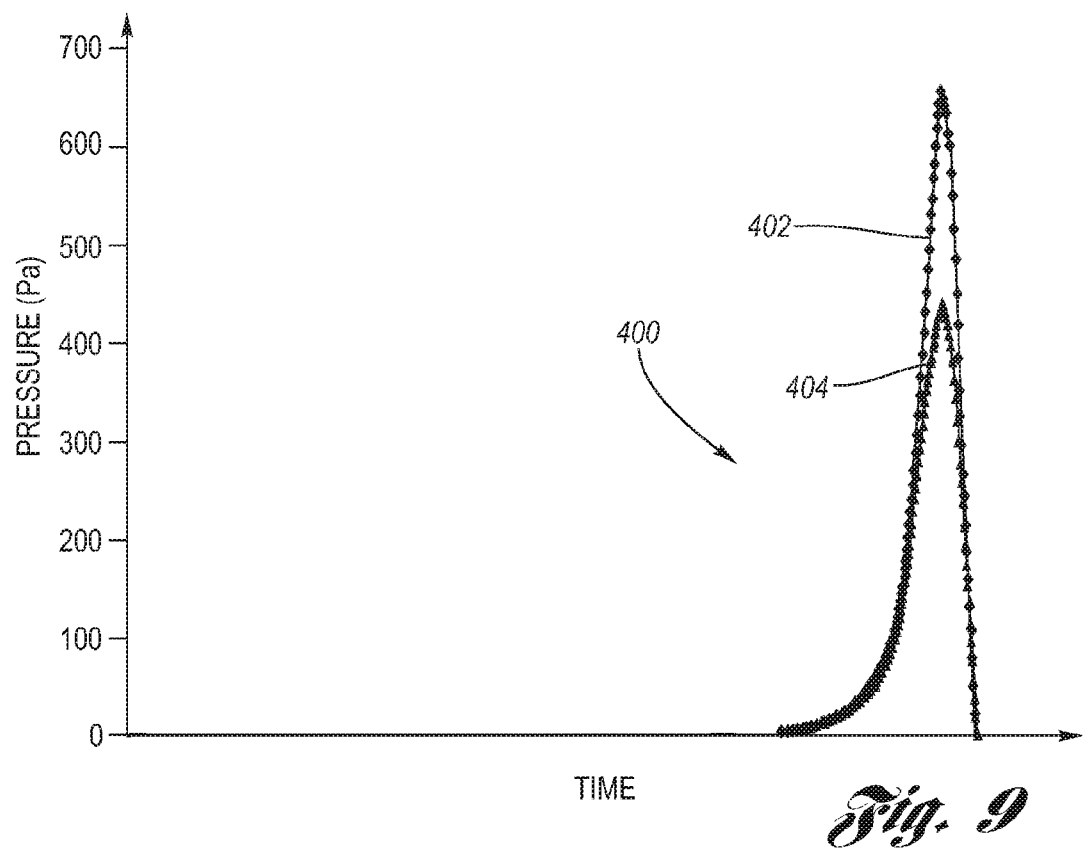
FIG. 9 is a graph comparing plots of air pressures versus time associated with door closures with and without the active body ventilation system according to the present invention.
Figure 10:
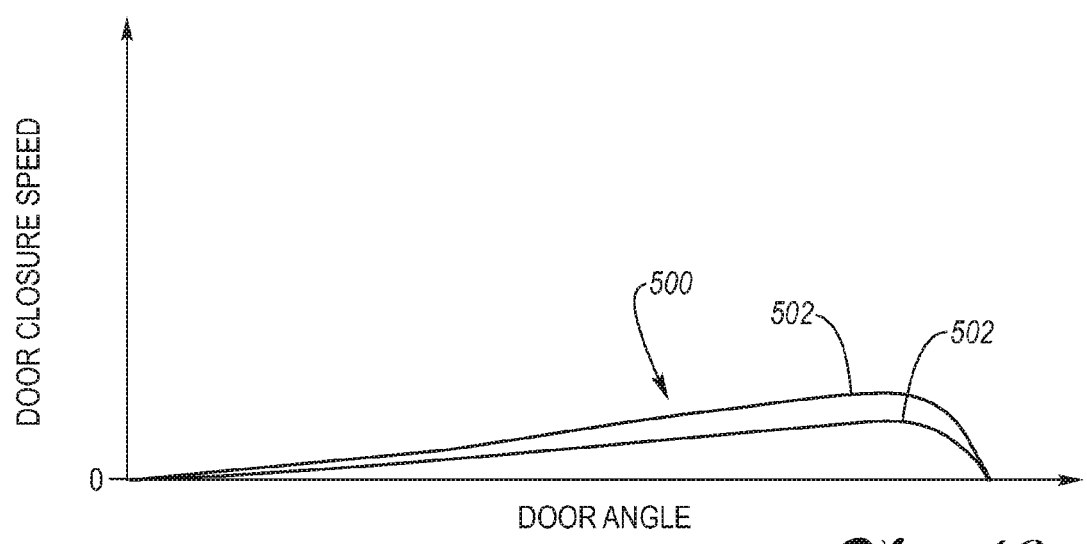
FIG. 10 is a graph comparing plots of door closing speed versus door angle associated with door closures with and without the active body ventilation system according to the present invention.

Turning attention now to FIGS. 9 and 10, performance characteristics of door closure with and without the active body ventilation system 200 (see FIG. 7) are graphically depicted.

At FIG. 9, a graph 400 of pressure versus time is depicted having two plots. A first plot 402 is for a door closed for a vehicle without the active body ventilation system according to the present invention. A second plot 404 is for a door closed for a vehicle with the active body ventilation system according to the present invention. It will be seen that a significant increase in passenger compartment air pressure is present for plot 402 as compared with plot 404. It is thus concluded that that door closure is much easier and there is less chance for passenger ear discomfort for vehicles equipped with the active ventilation system according to the present invention. Indeed, this benefit can be enhanced by making the portal larger in size, as desired.

At FIG. 10, a graph 500 of door closure minimum speed versus door angle is depicted having two plots. A first plot 502 is for a door closed for a vehicle without the active body ventilation system according to the present invention. A second plot 504 is for a door closed for a vehicle with the active body ventilation system according to the present invention. It will be seen that a significant decrease in door closure speed is present for plot 504 as compared with plot 502. It is thus concluded that that door closure is quicker for vehicles equipped with the active ventilation system according to the present invention.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An active body ventilation system for a motor vehicle body, comprising:
   an active ventilation unit, comprising:
      a portal housing, said portal housing having a portal opening disposed in the motor vehicle body which ventilates air inside the motor vehicle body to atmosphere outside the motor vehicle body;
      a portal cover adjoining said portal housing, said portal cover being movable between a first position whereat said portal opening is covered by said portal cover and a second position whereat said portal opening is uncovered a predetermined amount by said portal cover; and
      a portal cover actuator for moving said portal cover between said first and second positions; and
   an electronic control system, said electronic control system operatively regulating said portal cover actuator responsive to a plurality of predetermined parameters of the motor vehicle.

2. The system of claim 1, wherein said electronic control system comprises:
   an electronic control module having predetermined programming; and
   a plurality of sensors electronically connected with said module, wherein each said sensor senses a respective predetermined parameter of said plurality of predetermined parameters.

3. The system of claim 2, wherein said plurality of sensors comprise at least one sensor sensing whether any door of the motor vehicle is open;
   wherein if any door is sensed to be open, then said electronic control module signals said portal cover actuator to move said portal cover to said second position.

4. The system of claim 3, wherein said plurality of sensors further comprise at least one sensor sensing whether an engine of the motor vehicle is running and at least one sensor sensing a status of a heating, ventilation and air conditioning system of the motor vehicle;
   wherein if the engine is sensed to be running and the heating, ventilation and air conditioning system is sensed to be operating, then said electronic control module signals said portal cover actuator to move said portal cover to a position between said first and second positions which is at a predetermined optimum for the operation of the heating, ventilation and air conditioning system responsive to said status and said programming, otherwise said electronic control module signals said portal cover actuator to move said portal cover to said first position.

5. The system of claim 4, wherein said plurality of sensors further comprise at least one sensor sensing whether the doors are unlocked and further at least one sensor sensing whether the motor vehicle is parked;
   wherein if the engine is sensed to be running, the doors are sensed to be unlocked and the motor vehicle is sensed to be parked, then said electronic control module signals said portal cover actuator to move said portal cover to said second position.

6. The system of claim 4, wherein if the engine is sensed to be not running and the doors are sensed to be unlocked, then said electronic control module signals said portal cover actuator to move said portal cover to said second position for a predetermined period of time, and thereafter said electronic control module signals said portal cover actuator to move said portal cover to said first position.

7. A method for actively ventilating a body of a motor vehicle, comprising the steps of:
   disposing a portal opening in the motor vehicle body which ventilates air inside the motor vehicle body to atmosphere outside the motor vehicle body;
   locating a portal cover adjoining the portal opening, wherein the portal cover is movable between a first position whereat the portal opening is covered by the portal cover and a second position whereat the portal opening is uncovered a predetermined amount by the portal cover;
   electronically sensing predetermined parameters of the motor vehicle; and
   moving the portal cover between the first and second positions in predetermined response to said predetermined parameters to thereby selectively ventilate the motor vehicle body.

8. The method of claim 7, wherein said electronic sensing comprises sensing whether any door of the motor vehicle is open;
   wherein if any door is sensed to be open, then said predetermined response is to open said portal.

9. The method of claim 8, wherein said electronic sensing further comprises sensing whether the engine of the motor vehicle is running and sensing status of a heating, ventilation and air conditioning system of the motor vehicle;

wherein if the engine is sensed to be running and the heating, ventilation and air conditioning system is sensed to be operating, then said predetermined response is to open said portal a predetermined optimum amount responsive to said sensed status, otherwise said predetermined response to close said portal.

10. The method of claim 9, wherein if the doors are sensed to be unlocked and the motor vehicle is sensed to be parked and the engine is sensed to be running, then said predetermined response is to open said portal.

11. The method of claim 9, wherein if the doors are sensed to be unlocked and the engine is sensed to be not running, then said predetermined response comprises opening said portal for a fixed period of time; and thereafter closing of the portal.

* * * * *